Oct. 26, 1948.     H. B. SQUIRES     2,452,161
PARKING GUIDE
Filed Jan. 23, 1948
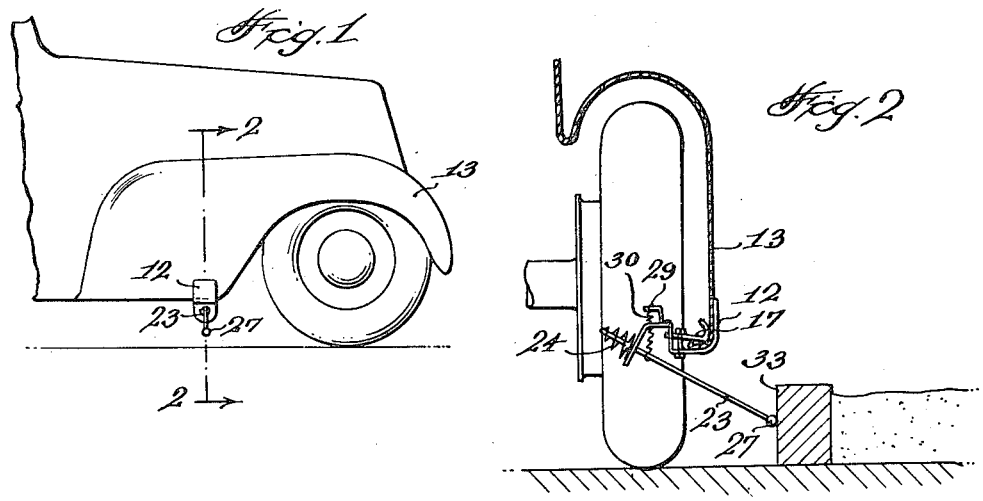
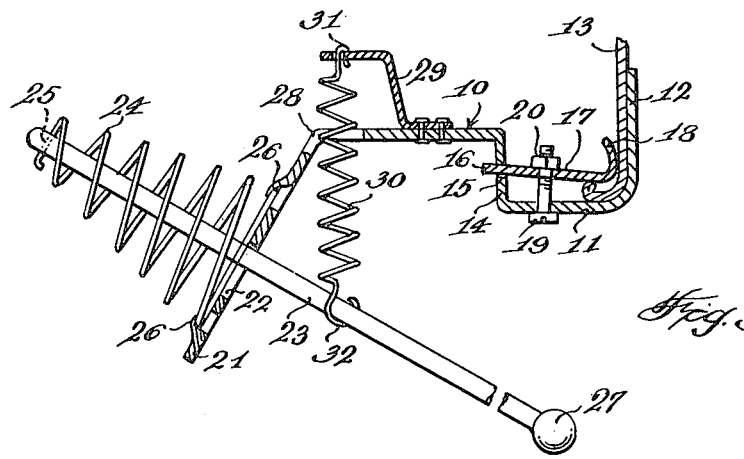
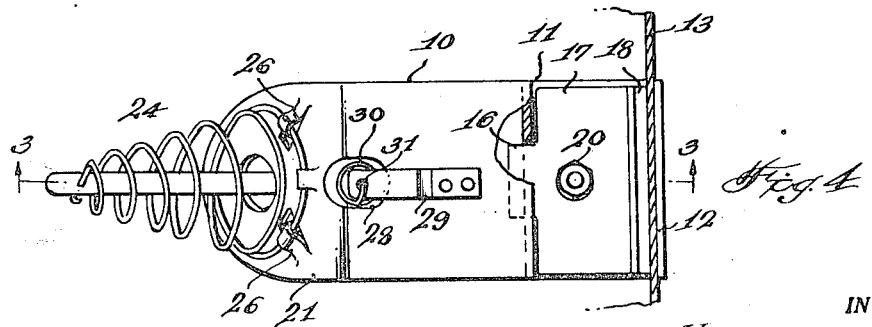
INVENTOR.
Harold B. Squires
BY Patrick D. Beavers
ATTY.

UNITED STATES PATENT OFFICE 2,452,161

PARKING GUIDE

Harold B. Squires, Los Angeles, Calif.

Application January 23, 1948, Serial No. 3,991

2 Claims. (Cl. 116—28)

The present invention relates to parking guides and it consists in the combinations, constructions and arrangements of parts herein described and claimed.

It is an object of the present invention to provide a simple, inexpensive, efficient and effective device for attachment to the fenders of automobiles to assist the driver thereof to properly park the same with respect to a curbing.

A further object of the invention is the provision of a parking guide having a guide rod adapted to contact a curb and emit a sound audible to the driver of a vehicle upon which the guide is mounted.

A further object of the invention is the provision of a novel mounting for a guide rod which forms a part of the invention.

A still further object of the invention is the provision of novel clamp forming a part of the invention.

Other and further objects of the invention will become apparent from a reading of the following specification taken in conjunction with the drawing, in which:

Figure 1 is a fragmentary side elevational view of an automobile having an embodiment of the invention attached thereto, Figure 2 is an enlarged sectional view taken along line 2—2 of Figure 1, Figure 3 is a sectional view taken along line 3—3 of Figure 4, and Figure 4 is a plan view of the device embodying the present invention.

Generally there is provided a parking guide which is preferably attached to the right front fender of an automobile by means of a novel clamp and which consists of an inwardly extending body having a downwardly slanting free inner end with an aperture through which a rod extends outwardly and beyond the plane of the side of the fender and adapted to come into contact with a curb as the automobile is driven in proximity thereto. A helical spring supports the inner end of the rod and a coil spring tensions the rod against the side of the aperture so that when the rod comes into contact with a curb or other object a scraping sound will be emitted which will be clearly audible to the driver. The springs will return the rod to its normal position whenever stress is removed therefrom.

Referring more particularly to the drawing, there is shown therein a parking guide comprising a body 10 of flat metal construction and having an integrally formed U-shaped bracket 11 whose outer arm 12 is adapted to bear against the outer side of an automobile fender 13. The inner arm 14 of the U-shaped member is provided with a slot 15 into which a tongue 16 of a flat clamping member 17 is loosely mounted. The free end of the clamping member is formed into a lip 18 adapted to bear against the inner wall of the fender 13.

A bolt 19 extends upwardly through the U-shaped member and through the clamping member 17 and is provided with a nut 20 to securely hold the body 10 between the clamping member 17 and the U-shaped member 11.

The inner end of the body 10 is provided with an angularly extending integrally formed arm 21 having an aperture 22 therein in which is loosely mounted a rod 23 which is adapted to bear against the upper side of the aperture 22. The inner end of the rod is fastened to the apex portion of a helical spring 24, as indicated at 25, and the base portion of the spring 24 is fastened to the arm 21 by means of integrally formed clamp members 26. The outer end of the rod 23 is formed in the shape of a ball 27.

An opening 28 is provided in the body 10 at the juncture of the arm 21 and a bracket 29 is riveted or otherwise fastened to the body 10 and extends upwardly therefrom. A tension spring 30 is connected at its upper end to the bracket 29, as indicated at 31, and to the rod 23, as indicated at 32.

In operation, it will be apparent that when it is desired to park the automobile to which this device is attached, the operator will approach the curbing 33 in the usual manner and when the ball 27 comes in contact therewith the rod 23 will scrape against the side of the aperture 22 causing a sound which will be clearly audible to the driver and will indicate to him that he is at a known distance from the curb. This knowledge will save the driver from overrunning the curb and also save unnecessary marring or wear upon the side walls of the tires of the vehicle. When the automobile is moved away from the curb the spring 24 will propel the rod back to its normal position and the spring 30 will assure the positioning of the rod 23 against the side of the aperture 22 when the rod is in its normal position, thus assuring the readiness of the device when it is desired to utilize the same in parking.

While but one form of the invention has been shown and described herein, it will be readily apparent to those skilled in the art that many minor modifications may be made without departing from the spirit of the invention or the scope of the appended claims.

What is claimed is:

1. A parking guide for vehicles wherein the vehicle has a fender, a clamp structure for attachment to the lower edge of the fender, said clamp structure being provided with an inclined depending plate having an opening therein, an elongated parking guide rod, slidably disposed through the opening, a coiled compression spring, having one end secured to the top side of the inclined plate and its upper end secured to the adjacent end of the guide rod.

2. A parking guide for vehicles wherein the vehicle has a fender, a clamp structure for attachment to the lower edge of the fender, said clamp structure being provided with an inclined depending plate having an opening therein, an elongated parking guide rod, slidably disposed through the opening, a coiled compression spring, having one end secured to the top side of the inclined plate and its upper end secured to the adjacent end of the guide rod, said clamp structure being provided with a riser and a tension spring, having one end secured to the riser and its other end supporting a medial portion of said rod.

HAROLD B. SQUIRES.

REFERENCES CITED

The following references are of record in the file of this patent:

UNITED STATES PATENTS

| Number | Name | Date |
|---|---|---|
| 2,066,641 | Mellor et al. | Jan. 5, 1937 |
| 2,281,806 | Schulman | May 5, 1942 |